United States Patent Office 3,489,512
Patented Jan. 13, 1970

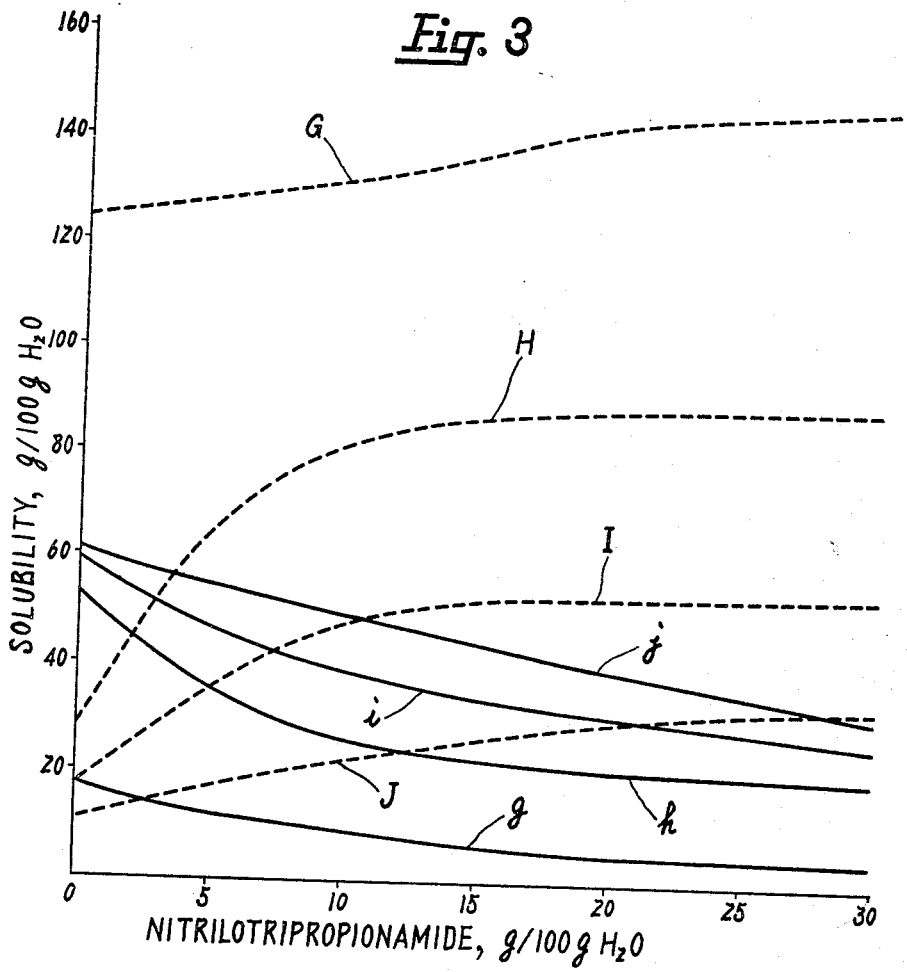

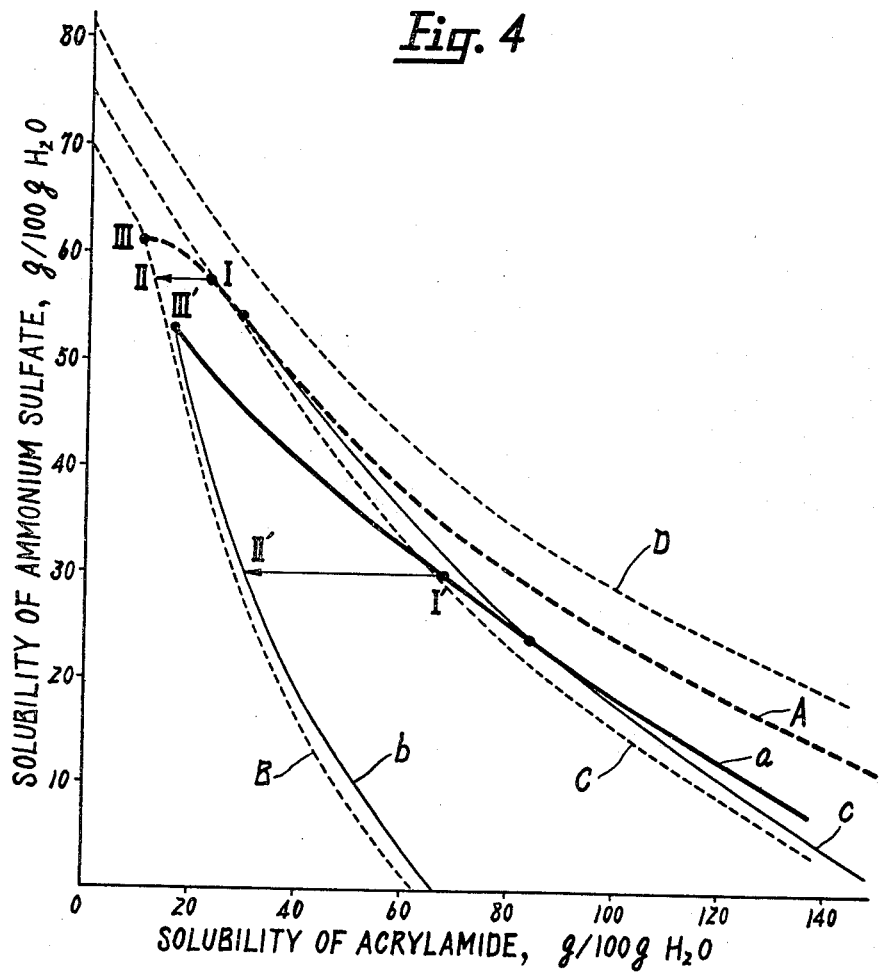

3,489,512
METHOD FOR THE SEPARATION OF AMMONIUM SULFATE FROM A SLURRY COMPRISED OF AN AQUEOUS ACRYLAMIDE SOLUTION AND SOLID AMMONIUM SULFATE
Kenzo Okuno, Masao Terazawa, Motokazu Kanokogi, and Yoshimasa Isogai, Kitakyushu-shi, Japan, assignors to Mitsubishi Chemical Industries Limited, a corporation of Japan
Filed Nov. 7, 1966, Ser. No. 592,964
Claims priority, application Japan, Aug. 26, 1966, 41/55,812
Int. Cl. B01d 43/00; C01c 1/24
U.S. Cl. 23—119                              16 Claims

ABSTRACT OF THE DISCLOSURE

A method for the separation of ammonium sulfate from a slurry which is obtained by the neutralization of acrylamide sulfate with ammonia and comprises an aqueous acrylamide solution and solid ammonium sulfate. Propionamideamine is added to the slurry when or after said neutralization takes place so that 3 to 30 parts by weight of propionamideamine are present for each 100 parts by weight of water contained in the slurry. The ammonium sulfate is then separated from the slurry at a temperature of 10 to 30° C.

---

The invention relates to a method for the separation of ammonium sulfate from a slurry comprised of an aqueous acrylamide solution and solid ammonium sulfate.

More particularly, the invention relates to a method for the separation of solid ammonium sulfate from a slurry comprised of an aqueous solution containing a considerable quantity of acrylamide dissolved therein and solid ammonium sulfate, obtained by hydrolysis of acrylonitrile in the presence of sulfuric acid and by subsequent neutralization of acrylamide sulfate produced by said hydrolysis which neutralization is effected by use of ammonia or an ammonium salt of a weak acid.

There has been proposed the method of the manufacture of acrylamide which comprises neutralizing acrylamide sulfate, produced by the hydrolysis of acrylonitrile, in an aqueous medium with ammonia or an ammonium salt; crystallizing and then separating solid ammonium sulfate produced as a by-product of said neutralization; and allowing the mother liquor to cool so as to separate free acrylamide crystals out of the mother liquor.

The said known method is based on the fact that the solubility at invariant point of acrylamide and ammonium sulfate in the three-component system comprising acrylamide, ammonium sulfate, and water varies considerably with the temperature of the system. The term "invariant point" as referred to herein implies the specific point in the acrylamide-ammonium sulfate-water equilibrium diagram at which all three phases, comprising two solid phases of acrylamide and ammonium sulfate and one liquid phase, are present together at a certain temperature.

The said method when carried out on an industrial scale has shortcomings in that the free acrylamide crystals are contaminated with ammonium sulfate and it is necessary to strictly control the pH of the reaction mixture in order to prevent acrylamide from being consumed in the course of the neutralization of acrylamide sulfate. According to said known method in which acrylamide is crystallized and then separated from the mother liquor produced by the crystallization and subsequent separation of ammonium sulfate therefrom, the product acrylamide crystals wet with the mother liquor tend to mix with the ammonium sulfate dissolved therein when the acrylamide crystals are separated from the mother liquor. Therefore, in order to avoid contamination of the product acrylamide with ammonium sulfate, it is desirable to obtain a mother liquor having the lowest possible concentration of ammonium sulfate upon the crystallization and separation of ammonium sulfate therefrom.

Meanwhile, it has been recognized that the solubilities at invariant points of acrylamide and ammonium sulfate in the acrylamide-ammonium sulfate-water system drastically vary when the temperature is elevated over about 20° C.

According to the diagram indicating the solubility of acrylamide and ammonium sulfate at the invariant points in said three-component system which diagram is shown in FIGURE 1, referred to in the later part of this description, when the temperature is elevated over about 20° C., the solubility of ammonium sulfate which is generally high at low temperatures suddenly drops while the solubility of acrylamide which is generally low at low temperatures steeply rises.

Hence, when the crystallization and separation of ammonium sulfate is effected below about 20° C. a mother liquor which is rich in ammonium sulfate content, poor in acrylamide content, and capable of yielding when cooled only a small amount of acrylamide crystals mixed with a considerable amount of ammonium sulfate is obtained.

Therefore according to the said known method, the crystallization and separation of ammonium sulfate are with carried out at temperatures which are usually higher than 30° C., but preferably from 40° C. to 50° C. In said range of temperatures acrylamide becomes so unstable that side reactions including polymerization are liable to occur. Since said side reactions occur more vigorously as the pH of the reaction mixture is increased, strict control of the operation conditions of the neutralization procedure is required so as to keep the pH constant.

We have discovered that the addition of propionamideamine to an acrylamide-ammonium sulfate-water system remarkably affects the solubility of both the acrylamide and the ammonium sulfate at the invariant point at temperatures below 30° C. so as to decrease the solubility of ammonium sulfate and to increase that of acrylamide. Hence, the crystallization and separation of ammonium sulfate at lower temperatures in the presence of propionamideamine results in a mother liquor which contains more acrylamide and less ammonium sulfate than in the conventional method and which is therefore capable of yielding more acrylamide crystals.

Accordingly, an object of the invention is to provide a method for the separation of solid ammonium sulfate from a slurry comprised of an aqueous acrylamide solution and solid ammonium sulfate at lower temperatures at which temperatures acrylamide is more stable.

Another object of the invention is to provide a method for effecting the separation of solid ammonium sulfate from a slurry comprised of an aqueous acrylamide solution and solid ammonium sulfate without the necessity for strict control of pH.

A further object of the invention is to provide a method for the separation of solid ammonium sulfate from a slurry comprised of an aqueous acrylamide solution and solid ammonium sulfate and the subsequent recovery of a solution which is high in acrylamide concentration and low in ammonium sulfate concentration.

Other objects and advantages of the invention will be apparent as the description proceeds.

The abovementioned objects are attained in accordance with the invention by the separation of solid ammonium sulfate from a slurry comprised of an aqueous solution containing a considerable amount of acrylamide dissolved therein and solid ammonium sulfate, said slurry being produced by neutralizing acrylamide sulfate in an aqueous medium with ammonia or an ammonium salt of a weak acid, said separation being effected at a temperature of from 10° C. to 30° C. and in the presence of 3 to 30 parts by weight of a propionamideamine or propionamideamines for each 100 parts by weight of water in the slurry.

In accordance with the invention, the neutralization of acrylamide sulfate is carried out by use of ammonia or ammonium salts of a weak acid as for example ammonium carbonate, ammonium bicarbonate, ammonium carbamate, or a mixture of compounds from which said salts are formed. Ammonium bicarbonate is preferred.

The neutralization of acrylamide sulfate is carried out in an aqueous medium. The aforementioned neutralizing agents is employed in a suitable form. For example, ammonium salts such as ammonium bicarbonate may be employed in the solid state, in the form of slurry, or in an aqueous solution. Ammonia may also be employed in the gaseous or liquid state, or in the form of an aqueous solution; preferably it is employed in the gaseous state. Although acrylamide sulfate may be employed in an aqueous solution or in any other suitable form, the viscous reaction product obtained by hydrolizing acrylonitrile with sulfuric acid and water may also be conveniently employed as is.

Since the neutralization of acrylamide sulfate and the subsequent separation of ammonium sulfate produced are, in accordance with the invention, performed at lower temperatures there is no need to control the pH of the solution as strictly as is required in the conventional methods. The preferred pH of the solution is 3–9, more particularly 5–8. With too high a pH, side reactions tend to occur. These side reactions lower the yield of acrylamide. Conversely, with too low a pH, hydrolysis which causes acrylamide to convert to acrylic acid and/or polymerization tends to occur. This results in increased viscosity of the reaction products and leads to solidification of the materials within the reactor. In accordance with the invention, the proportion between the acrylamide sulfate and the aqueous medium fed into the reactor is preferably adjusted so that upon neutralization the slurry may contain 30–150, preferably 50–80 parts by weight of acrylamide for each 100 parts by weight of water.

The invention is characterized in that the separation of ammonium sulfate is effected in the presence of a certain quantity of propionamideamine(s), said ammonium sulfate having been produced as a by-product in the course of the neutralization of acrylamide sulfate.

We have found that the addition of propionamideamine(s) to an acrylamide-ammonium sulfate-water system brings about a substantial change in the solubility of the acrylamide and the ammonium sulfate at the invariant points so that the separation of ammonium sulfate may be carried out at temperatures considerably lower than employed in the prior art. Propionamideamines employed for this purpose include β-aminopropionamide, β,β'-iminodipropionamide, and β,β',β''-nitrilotripropionamide. These propionamideamines may be employed individually or may be used in combination. Since an insufficient amount of propionamideamines is produced as a by-product when acrylamide sulfate is neutralized under ordinary conditions with ammonia, it is usually necessary to feed propionamideamine into the slurry in such an amount that the concentration of propionamideamine is maintained at a fixed value in the slurry.

In the case wherein the method of the invention is carried out continuously, that is to say, the separation of ammonium sulfate is immediately followed by cooling of the mother liquor to effect separation of acrylamide crystals and by circulation of the resulting mother liquor to the neutralization process for use as a reaction medium, the concentration of propionamideamine in the slurry may be maintained at a fixed value. This requires nothing more than compensating for the loss caused by the removal of the mother liquid from the reaction system in order to avoid accumulation of impurities in said system.

The invention will now be illustrated with reference to the attached drawings in which:—

FIGURE 3 is a diagram showing the relationship between the quantity of β,β'β''-nitrilotripropionamide contained in an aqueous medium and the respective solubility at invariant points of acrylamide and ammonium sulfate; and FIGURE 4 is a diagram showing the relationship between the solubilities of acrylamide and ammonium sulfate.

Figure 1:
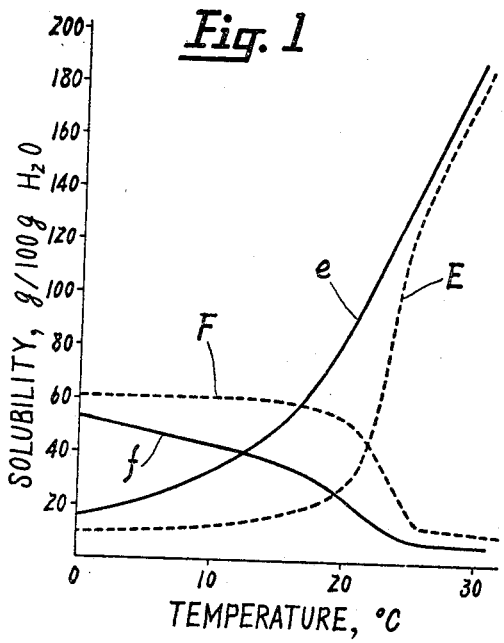
FIGURE 1 is a diagram showing the relationship between the respective solubility of the invariant points of acrylamide and ammonium sulfate in water and in an aqueous solution of β,β',β''-nitrilotripropionamide and temperatures.

Referring now to FIGURE 1, curves E and F indicate the respective solubility of acrylamide and ammonium sulfate at invariant points in an acrylamide-ammonium sulfate-water system. Curve e indicates the solubility of acrylamide at invariant point in the presence of 12 parts by weight of β,β',β''-nitrilotripropionamide for each to 100 parts by weight of water in the said three-component system while curve f implies that of ammonium sulfate under the same conditions. It should be appreciated that if β,β',β''-nitrilotripropionamide is present in the system, the solubility of acrylamide at invariant points increases while that of ammonium sulfate decreases. These changes in solubility are remarkable at temperatures below 30° C, especially below 25° C. In contra-distinction to the prior art, by virtue of the increase in the solubility of acrylamide the separation of ammonium sulfate, on an industrial scale, is advantageously carried out at lower temperatures as for example below 30 °C., even below 20° C.

Figure 2:
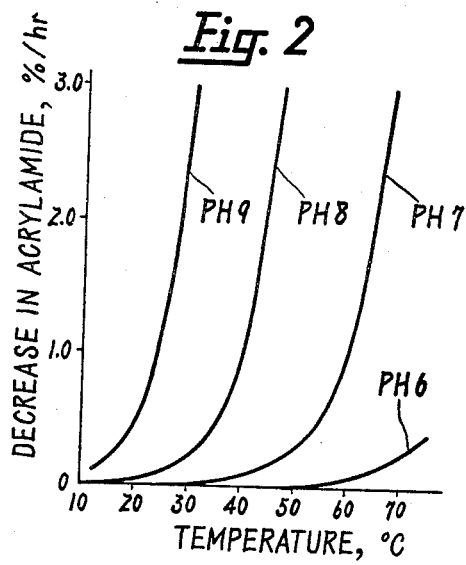
FIGURE 2 is a diagram showing the relationship between the rate of decrease in acrylamide in an aqueous ammonium sulfate solution, the pH thereof and temperature.

Referring to FIGURE 2, it is seen that the higher the temperature and/or pH, the greater will be the rate of decrease of acrylamide owing to side reactions including formation of propionamideamine. However, taking into account the local increase in pH at the inlet openings of the reactor for introducing the neutralizing agents, it is desirable to afford a wider allowable pH range. Therefore, the neutralization of acrylamide sulfate and the separation of ammonium sulfate formed as a by-product should be performed at as low a temperature as possible. However, temperatures in the range 10–30° C., especially in the range 15–20° C. are preferred to extremely low temperatures. As is apparent from FIGURE 1, extremely low temperatures have an unfavorable correlation with solubility.

Referring to FIGURE 3, curves G, H, I and J denote the solubility of acrylamide at the invariant points at 25° C., 20° C., 15° C. and 5° C., respectively, and curves g, h, i and j denote that of ammonium sulfate in the same sense. As is apparent from FIGURE 3, as a rule, with an increase in the quantity of propionamideamine there is an increase in the solubility of acrylamide and a decrease in the solubility of ammonium sulfate.

It is desirable that the slurry contain 3 to 30 parts by weight of propionamideamine for each 100 parts by weight of water contained in the slurry. However, as the quantity of propionamideamine is increased, the degree of effect thereof is reduced. Further, when an excessive quantity of proprionamideamine is used, the propionamideamine tends to get itself mixed with the product. Hence, it is advisable for a slurry to contain 3 to 30 parts, preferably 4 to 20 parts, still more preferably 10 to 16 parts by weight of propionamideamine for each 100 parts by weight of water.

The effect of the propionamideamine contained, in accordance with the invention, in an acrylamide-ammonium sulfate-water system with regard to the separation of ammonium sulfate as for example at 18° C. is theoretically illustrated by the diagrams shown in FIGURE. In FIGURE 4 curve A represents the locus of the invariant point at each of successive temperatures measured. Curves B, C, and D represent the solubilities at 0° C., 20° C., and 40° C., respectively, of ammonium sulfate and acrylamide in an aqueous medium. Further, curve $a$ represents the locus of the invariant point at each of successive temperatures measured when the said three-component system contains 12 parts by weight of nitrilotripropionamide for each 100 parts by weight of water. Curves $b$ and $c$ represent the solubilities of ammonium sulfate and acrylamide under the same conditions at 0° C. and 20° C., respectively. When the solution contains no nitrilotripropionamide the invariant point, at 18° C. is located at point I. As the solution is cooled to 0° C., while crystallizing and separating acrylamide therefrom, the composition of the solution varies to attain the point as indicated at II. As ammonium sulfate is added to the solution, the composition of the solution varies along the line II–III to attain the invariant point at 0° C. as indicated at III. On the other hand, the invariant point is located at the point I′ for a solution containing nitrilotripropionamide. As the solution is cooled to 0° C., the composition of the solution varies to attain the point as indicated at II′. As ammonium sulfate is added to the solution, the composition varies further along the line II′–III′ to attain the point III′ which represents the invariant point at 0° C. Some data including quantities of acrylamide yielded by such operation are listed in Table 1 below:

TABLE 1

|  | Without NTPA [3] | With NTPA |
| --- | --- | --- |
|  | Point I | Point I′ |
| Composition of solution upon separation of ammonium sulfate: |  |  |
| AAM,[1] g./100 g. H₂O | 22 | 67 |
| AS,[2] g./100 g. H₂O | 57 | 30 |
|  | Point II | Point II′ |
| Composition of solution upon completion of cooling: |  |  |
| AAM, g./100 g. H₂O | 12 | 30 |
| AS, g./100 g. H₂O | 57 | 30 |
| AAM yielded by cooling, g./100 g. H₂O | 10 | 37 |
|  | Point III | Point III′ |
| Composition of solution upon addition of AS: |  |  |
| AAM, g./100 g. H₂O | 10 | 16 |
| AS, g./100 g. H₂O | 61 | 53 |
| AAM yielded by addition of AS, g./100 g. H₂O | 2 | 14 |

[1] Acrylamide.
[2] Ammonium sulfate.
[3] Nitrilotripropionamide.

As is apparent from the above Table 1, the presence of propionamideamine, such as nitrilotripropionamide, makes it possible to change the composition of the solution after the separation of ammonium sulfate so that the concentration of acrylamide will be increased and that of ammonium sulfate decreased. Hence, it is also possible to obtain a greater yield of acrylamide while retaining a smaller concentration of ammonium sulfate in the solution. This in turn results in a lesser quantity of ammonium sulfate entering the product acrylamide. After the crystallization and subsequent separation of acrylamide, an additional quantity of ammonium sulfate may be advantageously added in accordance with the variation as compared with conventional methods, to the solution for the additional crystallization and separation of acrylamide out of the solution.

The features and advantages of the invention may be summarized as follows:

(1) The remarkable increase in the solubility of acrylamide at the invariant points by virtue of the presence of propionamideamine permits the operation of the method of the invention at temperatures which are lower than those employed in conventional methods. As a result, lower temperatures, even below 20° C. which have never been employed in the conventional methods can be used in accordance with the invention to effect crystallization and subsequent separation of ammonium sulfate.

(2) The crystallization and separation at lower temperatures of ammonium sulfate brings about improved stability of acrylamide in the solution and decreased formation of by-products. Since the by-product formation is decreased the quantity of mother liquid removed from the reaction system after the separation of acrylamide prevent accumulation of by-products in the reactor during its continuous operation, may also be decreased. This results in an increased yield of acrylamide. Further, the decrease in formation of by-product contributes to the improvement in the quality of the product acrylamide crystals.

(3) The improved stability of acrylamide permits a wider allowable range in operation conditions, particularly in the pH of the slurry thereby facilitating operation of the process. Further, the derceased formation of by-products makes operation of the process simple and, makes operation over longer periods of time safe.

The invention will now be described in more details with reference to the following examples which are intended only for purposes of illustrating the invention and not for purposes of limiting same. It should be noted that in these examples the term "part" means "part by weight."

EXAMPLE 1

A neutralization reaction tank provided with a stirrer and cooling apparatus was employed. 314 parts of an aqueous solution containing 34 parts of $\beta$, $\beta'$, $\beta''$-nitrilotripropionamide were put into the tank. 480 parts of acrylamide sulfate, obtained by hydrolyzing acrylonitrile with sulfuric acid and water, and 99.5 parts of gaseous ammonia were then fed continuously under stirring for 3 hours to said tank to effect neutralization. The reaction mixture was then stirred for about 10 minutes to complete the neutralization. During the reaction, the temperature inside the tank was kept at 18–19° C. and the pH of the reaction mixture was controlled at 5–8. Upon completion of the reaction the reaction slurry was analyzed. The results of the analysis showed the formation of 183.4 parts of acrylamide, calculated for 97.0% yield of acrylamide based on the quantity of acrylonitrile employed.

The reaction slurry was then kept at 18° C., and crystals of ammonium sulfate were separated out by centrifugal filtration. The resulting filtrate was found to contain 65.5 parts acrylamide and 34.0 parts ammonium sulfate dissolved in 100 parts water.

The quantity of acrylamide contained in the crystals of ammonium sulfate obtained by said centrifugal filtration measured less than 0.3%. The acrylamide was easily washed with water.

COMPARATIVE EXAMPLES 2 AND 3

The neutralization reaction tank of Example 1 was employed. In each example a quantity of water was put in the tank. The indicated amount of acrylamide sulfate, obtained by hydrolyzing acrylonitrile with sulfuric acid and water, and gaseous ammonia were then fed continuously under stirring for 3 hours into the tank to effect the neutralization reaction. The reaction mixture was then stirred for about 10 minutes to complete the reaction. During the reaction, the temperature and pH were controlled to the indicated predetermined degrees. Upon completion of the reaction in each example, the reaction slurry was analysed to determine the quantity of acrylamide formed and then filtered at the predetermined temperature to separate ammonium sulfate out of the reaction slurry. The comparative analysis of each resulting filtrate is shown in Table 2. The results of Example 1 have been listed in Table 2 for purposes of comparison.

TABLE 2

|  | Comparative Ex. 2 | Comparative Ex. 3 | Ex. 1 |
|---|---|---|---|
| Water fed, parts | 270 | 300 | 280 |
| AAMS,[1] parts | 600 | 225 | 480 |
| (Corresponding mols of acrylonitrile) | (3.32) | (1.25) | (2.66) |
| Ammonia, parts | 124.3 | 46.7 | 99.5 |
| Neutralization conditions: | | | |
| Temperature, °C | 38–43 | 20–22 | 18–19 |
| pH | 4–5 | 5–6.5 | 5–8 |
| Acrylamide formed, percent (based on acrylonitrile) | 92.4 | 95.3 | 97.0 |
| Ammonium sulfate separation temperature, °C | 40 | 22 | 18 |
| Composition of solution after ammonium sulfate separated: | | | |
| Acrylamide, g./100 g. $H_2O$ | 80.7 | 28.0 | 65.0 |
| Ammonium sulfate, g./100 g. $H_2O$ | 34.5 | 54.0 | 34.5 |

[1] Acrylamide sulfate.

REMARKS.—In the course of the neutralization reaction in the comparative Example 2, there occurred segregation of viscous matter.

EXAMPLE 4

The neutralization reaction tank of Example 1 was employed. 173 parts of mother liquor containing nitrilotripropionamide and water in the proportion of 12:100, obtained by crystallization and subsequent separation of acrylamide out of the filtrate at 0° C., said filtrate being produced by the separation of ammonium sulfate in Example 1, were put into the tank. 78.5 parts of acrylamide sulfate obtained by hydrolyzing acrylonitrile with sulfuric acid and water, and ammonia were then continuously fed under stirring into the tank to effect the neutralization reaction. It required about 2 hours to complete the feed. The reaction mixture was then stirred for about 10 minutes to complete the reaction. 16.5 parts of ammonia were required for the neutralization. During the reaction, the temperature inside the reaction tank was kept in the range 18–19° C. and the pH of the reaction slurry was controlled within the range 5–8. Upon completion of the reaction, the slurry was found to contain 58 parts of acrylamide. By substracting the quantity of acrylamide contained in the mother liquor, which was supplied to the reaction tank, from said 58 parts, the formation of acrylamide by the reaction was found to be 30 parts, calculated for 97% yield of acrylamide based on acrylonitrile.

Upon completion of the neutralization reaction, ammonium sulfate was removed from the slurry at 18° C. by centrifugal separation. The resulting filtrate was cooled to 0° C. to crystallize acrylamide which was then separated by centrifugal separation from the mother liquor and washed with 3 parts of water to obtain 29 parts of refined acrylamide crystals. The refined acrylamide crystals were found to contain 0.3% of ammonium sulfate and no nitrilotripropionamide.

EXAMPLE 5

The neutralization reaction tank of Example 1 was employed. 237 parts of an aqueous solution containing 25.5 parts of nitrilotripropionamide were put into the tank. 500 parts of acrylamide sulfate, obtained by hydrolyzing acrylonitrile with sulfuric acid and water, which corresponded to 2.76 mols of acrylonitrile and 480 parts of ammonium bicarbonate powder were then gradually fed under stirring into the tank to effect the neutralization reaction. It required about 2 hours to complete the feed. The reaction mixture was then stirred for about 10 minutes to complete the reaction. During the reaction the temperature inside the tank was kept at about 18° C. and the pH of the solution was controlled within the range 5–8. The control of pH was achieved with ease as compared with the case wherein ammonia was employed as the neutralizing agent.

Upon completion of the reaction the reaction slurry was analyzed. The analysis indicated the formation of 192.7 parts of acrylamide, calculated for 98.2% yield based on acrylonitrile. The reaction slurry was maintained at 18° C. and crystals of ammonium sulfate were separated out of the slurry by centrifugal filtration. The resulting filtrate contained 60 parts acrylamide and 35 parts ammonium sulfate dissolved in 100 parts water.

We claim:

1. A method for the separation of ammonium sulfate from a slurry of an aqueous acrylamide solution and ammonium sulfate, said slurry being produced by neutralizing acrylamide sulfate with at least one neutralizing agent selected from the group consisting of ammonia and ammonium salts of weak acids, which method comprises the steps of adding a propionamideamine or propionamideamines to said slurry so that 3 to 30 parts by weight of propionamideamine or propionamideamines are present for each 100 parts by weight of water contained in said slurry, and then separating ammonium sulfate from said slurry at a temperature of 10 to 30° C., whereby said ammonium sulfate is obtained.

2. A method according to claim 1 wherein propionamideamine or propionamideamines is added to said slurry when the neutralization of acrylamide sulfate takes place.

3. A method according to claim 1 wherein said neutralization of acrylamide sulfate is carried out at a temperature of 10 to 30° C.

4. A method according to claim 1 wherein said acrylamide sulfate is neutralized with ammonia.

5. A method according to claim 1 wherein said propionamideamine is $\beta,\beta',\beta''$-nitrilotripropionamide.

6. A process for obtaining ammonium sulfate comprising neutralizing acrylamide sulfate in an aqueous medium at a temperature of 15 to 20° C. and at pH 5 to 8 to form a slurry of an aqueous acrylamide solution and ammonium sulfate; adding to said slurry propionamideamine or propionamideamines to increase the quantity thereof to the proportion of 3 to 30 parts by weight of propionamideamine or propionamideamines for each 100 parts by weight of water contained in said slurry; separating ammonium sulfate out of the slurry at a temperature af 15 to 20° C., whereby said ammonium sulfate is obtained.

7. A method according to claim 6 wherein said propionamideamine is $\beta,\beta',\beta''$-nitrilotripropionamide.

8. A method according to claim 6 wherein said propionamideamine or propionamideamines is added to said slurry when the neutralization of acrylamide sulfate takes place.

9. A method for the separation of ammonium sulfate from a slurry, said slurry containing 3 to 30 parts by weight of propionamideamine or propionamideamines for each 100 parts by weight of water contained in said slurry, comprising the following steps:
   neutralizing acrylamide sulfate with at least one neutralizing agent selected from the group consisting of ammonia, ammonium carbonate, ammonium bicarbonate and ammonium carbamate in a neutralization reaction zone at a temperature of 10 to 30° C. and at a pH of 5 to 8 to form a slurry containing an aqueous acrylamide solution and ammonium sulfate;
   separating said slurry into ammonium sulfate and an aqueous acrylamide solution, at a temperature of 10 to 30° C.;
   cooling said aqueous acrylamide solution separated from said slurry to form an acrylamide slurry;
   separating said acrylamide slurry into acrylamide and an aqueous solution containing propionamideamine or propionamideamines; and
   then recycling at least a part of said aqueous solution separated from said acrylamide slurry and containing propionamideamine or propionamideamines into the neutralization reaction zone.

10. A method according to claim 9 wherein said neutralizing agent is ammonia.

11. A method according to claim 9 wherein the neutralization of acrylamide sulfate and the separation of ammonium sulfate from the slurry are both carried out at a temperature of 15 to 20° C.

12. A method according to claim 9 wherein said propionamideamine is β, β', β''-nitrilotripropionamide.

14. A method according to claim 9 wherein the slurry obtained by the neutralization of acrylamide sulfate contains 4 to 20 parts by weight of propionamideamine dissolved therein for each 100 parts by weight of water contained in said slurry.

14. A method for the separation of ammonium sulfate from a slurry, said slurry containing dissolved therein 3 to 30 parts by weight of propionamideamine or propionamideamines and 50 to 80 parts by weight of acrylamide for each 100 parts by weight of water contained therein, comprising the steps of:

neutralizing acrylamide sulfate with ammonia at a temperature of 15 to 20° C. at pH 5 to 8 in a neutralization reaction zone to form a slurry of an aqueous acrylamide solution and ammonium sulfate;

separating said slurry into ammonium sulfate and an aqueous acrylamide solution, at a temperature of 15 to 20° C.;

cooling said aqueous acrylamide solution separated from said slurry to form an acrylamide slurry containing solid acrylamide;

separating said acrylamide slurry into acrylamide and an aqueous solution containing propionamideamine or propionamideamines; and then recycling at leas ta part of said aqueous solution separated from the acrylamide slurry and containing propionamideamine or propionamideamines into said neutralization reaction zone.

15. A method according to claim 14 wherein the slurry obtained by the neutralization of acrylamide sulfate contains dissolved therein 4 to 20 parts by weight of propionamideamine or propionamideamines for each 100 parts by weight of water contained in said slurry.

16. A method according to claim 14 wherein said propionamideamine is β, β', β''-nitrilotripropionamide.

References Cited

UNITED STATES PATENTS 2,798,887    7/1957    Bikales _____ 260—561

OSCAR R. VERTIZ, Primary Examiner

E. C. THOMAS, Assistant Examiner

U.S. Cl. X.R.

260—561